Figure 1:
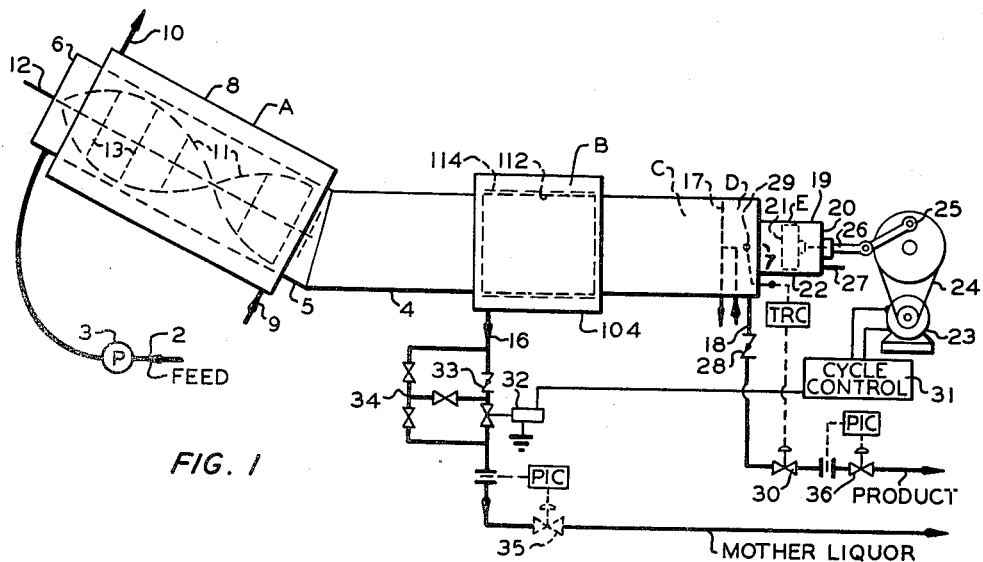

June 22, 1965

F. L. STOLLER ETAL 3,190,450

FILTER FOR A CRYSTAL PURIFICATION COLUMN

Filed Aug. 6, 1962

INVENTORS
F.L. STOLLER
H.W. GOARD
BY
*Young and Quigg*
ATTORNEYS

United States Patent Office 3,190,450
Patented June 22, 1965

3,190,450
FILTER FOR A CRYSTAL PURIFICATION COLUMN
Frederick L. Stoller and Howard W. Goard, Bartlesville, Okla., assignors to Phillips Petroleum Company, a corporation of Delaware
Filed Aug. 6, 1962, Ser. No. 215,190
1 Claim. (Cl. 210—179)

The invention relates to method and apparatus for the separation of solids from a liquid. In another aspect, the invention relates to the separation of mother liquor from a crystals-mother liquor slurry in a crystal purification column.

Purification by means of fractional crystallization has been proposed by a number of methods. Generally, the processes are applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. In addition, the process is of great value in the resolution of non-aqueous mixtures, for example, the separation of para-xylene from a mixture thereof with other xylene isomers and ethylbenzene.

In the Patent No. 2,854,494 issued to Rosswell W. Thomas, there is described a process and apparatus for the purification of crystals wherein a mass of crystals to be purified together with the accompanying mother liquor is passed through a purification chamber containing a filter which is integral with the wall of said chamber and positioned at an intermediate part thereof, then through a reflux zone toward a heating means positioned in one end of the chamber which heating means melts the crystals which arrive in the vicinity thereof. The melt is then withdrawn in part as purified product and forced in part into the reflux zone toward the filter with a pulsating back pressure being applied to the contents of the purification chamber by means of a reciprocating piston positioned in a cylinder which is in open communication with said chamber at the end in which said heating means is positioned. The back pressure, produced by any means known to those skilled in the art, is sufficient to produce a counterflow of liquid relative to the movement of the crystals. Thus, the impure crystals are being contacted with a reflux of pure melt which results in a melting of the impure crystals and a refreezing of the liquor to produce purer crystals.

It has now been surprisingly discovered that the method and apparatus chosen for the filtration of the mother liquor from the mass of crystals is a prime factor in the determination of the throughput rate. Heretofore, one satisfactory filtering means has comprised a filter integral with the wall of the purification chamber, said filter comprising a back-up plate which is perforated to permit the passage of mother liquor to an annulus which is in communication with the outlet pipe, a filtering screen which is adjacent to and interior of the back-up plate, and an inner perforated metal plate which is adjacent to the interior of said screen and in direct contact with the mass of moving crystals. The inner plate is designed primarily to protect the fine filter screen. It was discovered that the moving mass of crystals, which is, for all practical purposes, ice, soon filled the perforations of the inner liner and these islands then freeze to a solid block of crystals and result in a stoppage of flow and channeling of mother liquor.

It is an object of the invention to provide an improved method and apparatus for the purification of crystals.

It is another object of the invention to provide an improved method and apparatus for the separation of a mass of solids from a liquid.

Yet another object of the invention is to provide an improved method and apparatus for the separation of mother liquor from a mass of moving crystals in a crystal purification column.

These and other objects of the invention will be readily apparent to those skilled in the art from the accompanying disclosure, drawings and appended claim.

These objects are broadly accomplished by a filtering means comprising, in combination an open ended filter housing having at least one outlet for the removal of liquid therefrom, an open ended perforated member positioned interiorly of said housing and forming an annular space therewith for the collection of liquid, an open ended coarse screen adjacent the interior of said perforated member, and an open ended fine screen adjacent the interior of said coarse screen whose interior surface is in contact with a mass of moving crystals passing longitudinally through the interior of said fine screen.

In another embodiment of the invention, the fine filter screen which is in direct contact with the moving crystals is composed of a series of parallel fine wires which act as the principal filtering zones, supported by a series of transverse parallel wires whose spacing is substantially greater than said fine wires, said series of parallel fine wires being positioned longitudinally on the filter cylinder and in the same direction as the direction of the flow of the mass of crystals.

The invention is best illustrated by reference to the accompanying drawings. FIGURE 1 illustrates the positioning of the filter screen in a purification column of the type disclosed and claimed in the patent to Thomas, supra.

Figure 2:
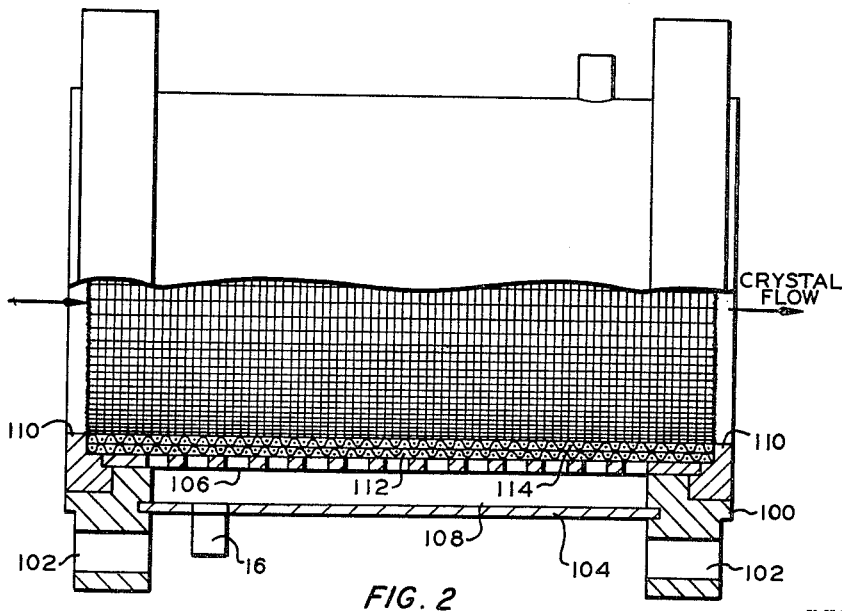

FIGURE 2 is a cross section of a suitable filtering apparatus according to this invention.

The apparatus of FIGURE 1 comprises freezing or crystallizing means A, a filtering means B, a reflux zone C, a melting section D, and a pulsation-producing device E.

A feed mixture comprising two or more components, one of which is separable from the mixture by crystallization, enters the apparatus through inlet 2 and is forced by means of pump 3 into the chilling section A of the main purification column. The purification apparatus is composed of a cylindrical shell 4, to which is attached a cooling section which comprises a cylindrical shell 5. The shells 4 and 5 can be constructed of ordinary metal pipe and can be welded together at any desired angle, as indicated in the drawing; or they can be connected by flanges or by threads. Alternatively, they can be one single length of pipe which can be built in the form of an elbow at any desired angle. The particular angle shown in the drawing can vary within a very broad range or the entire apparatus can be straight.

The purification apparatus is closed by means of end members 6 and 7, which can be of any suitable form known in the art. Crystallization section A comprises, in addition to shell 5, a cooling jacket 8 having inlet 9 and outlet 10. Positioned within the crystallization section is an agitating or scraping means 11, which is designed to prevent the accumulation of solid material on the heat exchange surface. Scrapers 11 are suitably constructed of strips of metal or other suitable materials known in the art. They can be fabricated in the form of a helix, as indicated in the drawing, or can be straight. Any suitable number of scrapers 11 can be provided. They are mounted on a rotatable shaft 12 by means of members 13. Shaft 12 is axially positioned in shell 5 and is connected to any suitable source of power for rotating the scrapers, such power source not being shown in the drawing. Shaft 12 is suitably sealed in end member 6 by means of a packing gland of any desired type known in the art. Suitable cooling of the feed which enters shell 5 can be provided by adding a coolant through inlet 9 and withdrawing the coolant through outlet 10. Sufficient cooling in section A is provided so that, a predetermined amount of solid crystals is produced, as subsequently discussed herein. The resulting crystal mass passes through purification chamber 4 and into filter section B.

As a general rule, the feed pump 3 is generally suitable for forcing the crystal mixture through the purification column. However, other means for propelling the mixture through the purification zone can be provided, as shown in the patents to Schmidt Re. 23,810 (1954) and Thomas, supra. Where such means, for example, a piston, is provided, it can be positioned upstream from section A or intermediate the chilling section A and purification section 4, or other suitable arrangements can be provided by those skilled in the art.

Filtration section B comprises a filter medium comprising filter screens 112 and 114 and backup plate 106 and an external shell 104, the latter being positioned with an outlet pipe 16 for filtration. It is in this filter medium wherein the instant invention resides. A detailed cross section is hereinafter described with reference to FIGURE 2. Filtrate produced in filter zone B is removed from the system through outlet 16.

The remaining crystal mass passes through reflux zone C wherein it is countercurrently contacted with liquid reflux produced as subsequently described.

As the crystal mass approaches heater 17 in melting section D, the crystals are melted. Heater 17 can be in the form of an electrical heater or a heat transfer coil through which a suitably heated fluid is pumped. Part of the melt produced by heater 17 is withdrawn through outlet pipe 18 as a purified product of the process. The remainder of the melt is forced back into reflux zone C to form reflux which effects crystal purification. Although an internal heater 17 is shown, an external heater, for example, a heating jacket encompassing section D and provided with means for circulating a heating fluid therethrough, can be used, if desired.

The pulsation-producing member E comprises a cylinder 19 which is suitably attached to closure member 7, as, for example, by welding, and closure means 20, together with a reciprocable piston 21. Piston 21 is suitably sealed in cylinder 19, for example, by means of rings 22, to prevent the leakage of melt from the purification. Reciprocation of piston 21 is produced, for example, by an electric motor 23, a belt 24, a crank means 25, and connecting rods 26, which can be sealed in closure member 20 by means of a packing gland. An outlet 27 is provided in closure member 20 to facilitate the reciprocation of piston 21 and can be connected to means, not shown, for recovery of any material which might escape from column 4 in case of failure of rings 22.

While the crystal mass is being advanced from chilling section A through filtration section B, reflux section C, and melting section D, piston 21 is reciprocated at a suitable rate, which is subsequently discussed herein so that a pulsating pressure is exerted on the melt reflux which is intermittently forced back, countercurrently with respect with respect to the crystal mass, through reflux zone C. In melt outlet 18 is positioned a check valve 28 to prevent the back flow of withdrawn melt into the crystal purification column. A temperature recorder-controller, designated in the drawing as TRC, is provided and is connected to a suitable temperature sensitive device, such as a thermocouple indicated by the numeral 29. The thermocouple is preferably positioned within the purification column at a point adjacent heater 17. The temperature recorder-controller is also operatively connected to a valve 30. The temperature recorder-controller is of any suitable design known in the art and can suitably comprise a device of known design for converting the electrical effect produced by thermocouple 29 to an air pressure which is utilized to open or close valve 30. The temperature recorder-controller is suitably so adjusted that an undesirably rapid advance of crystals through reflux zone C results in a predetermined low temperature which is measured by thermocouple 29, which operates through the temperature recorder-controller to throttle valve 30 and decrease the rate of withdrawal of melt. An undesirably slow advance of crystals through the purification column produces the opposite effect. The described combination of apparatus and the method for controlling melt withdrawal rate is disclosed and claimed in U.S. Patent 2,919,991 (1960) to J. D. Ratje.

Also shown in the drawing is a cycle control device 31, of known design, which is operatively connected with motor 23 so that an electrical pulse is produced in synchronism with piston 21. The cycle control 31 can be so adjusted that, on the compression stroke of piston 21, an otherwise closed solenoid valve 32 is opened, resulting in the removal of filtrate from the purification column only on the compression stroke of piston 21. Also provided, to aid in accomplishing this effect, is check valve 33 in filtrate withdrawal line 16. A similar arrangement can be effected in connection with the withdrawal of melt through outlet 18. However, it is preferred, in such a case, that the melt withdrawal cease during the compression stroke of the piston. Means for producing this result are not shown in the drawing. Cycle control means 31 can, for example, be operatively connected to crank 25 or connecting rods 26. It can include an electrical make-and-break device, such devices being well known in the art.

It has been found that although the described synchronism of withdrawal with the compression stroke of the piston 21 produces satisfactory results, it is not necessary. A suitable, and often preferred, arrangement is to utilize bypass 34, solenoid valve 32 and/or check valve 33 being closed and bypassed. In this mode of operation, it is desirable to utilize a predetermined back-pressure on the liquid being withdrawn through outlet 16. This back-pressure is to be distinguished from that intermittently applied by the piston within the column. The filtrate or mother liquor back-pressure is an external back-pressure and can be constant; it need not be intermittent. For the purpose of controlling filtrate back-pressure, a pressure indicator-controller designated as PIC in line 16, can be utilized. This instrument is of a type well known in the art and converts a back-pressure in the liquid withdrawal line 16 to an air pressure, which suitably throttles motor valve 35 to maintain a desired back-pressure in line 16. A similar instrument arrangement can be utilized in connection with valve 36 in melt withdrawal line 18. The foregoing external back-pressure control is disclosed and claimed in the patent to Ratje, supra.

Although the purification chamber 4 is shown positioned horizontally, it can be operated in other positions and frequently it is preferred to maintain the chamber in vertical position with cylinder 20 and piston 21 at the top so as to employ gravity as an aid to the flow of reflux.

It has been found that certain ranges of frequency of pulsation of the back-pressure applied produces results superior to certain other ranges of frequency. In the separation of para-xylene from its isomers improved results are obtainable at a frequency as low as 50 pulsations per minute or as high as 400 pulsations per minute. Highly superior results are obtained in the range from 150 to 250 pulsations per minute.

FIGURE 2 illustrates a particularly suitable filtering assembly comprising a filter housing 100 attached to the purification column by means of a flange 102, a perforated back-up member 106 forming an annular space 108 with said housing, said housing having an outlet pipe 16, a back-up screen 112 and a fine screen 114. The perforated back-up plate is preferably designed so as to produce a maximum of open space for the removal of mother liquor to the annulus 108. A suitable back-up plate is composed of 5/16" by 1" oblong end staggered ½" centers with 52 percent open spaces in a ⅛" thick type 304 stainless steel perforated member. Directly adjacent to the interior of the back-up plate and in contact therewith is a back-up coarse filter screen 112. Directly adjacent the interior of said back-up coarse screen is a fine screen which is the actual filtering medium. This fine screen is in direct contact with the moving crystals and is designed so as to provide a minimum of resistance to the flow of crystals through the filter zone. It has been found that as compared to the employment of a perforated inner liner which is in contact with the moving mass of crystals that the employment of a fine screen in contact therewith makes it possible to substantially increase the throughput of crystals through the purification column. A suitable coarse screen is a 10 x 10 type 304 stainless steel screen with a 20 x 350 type 304 stainless steel screen inside the coarse screen. Although the invention has been described with reference to a cylindrical filtering housing and screens which are welded to member 110, it is believed obvious that other shapes, such as ovals, which provide a smooth flow path with a minimum of obstruction to the mass of moving crystals is suitable. The size of the filter screen may vary over wide ranges and depends primarily on the size of the crystals being filtered.

It has also been surprisingly discovered that even when employing a fine filtering screen in direct contact with the mass of moving crystals that it is important to align the finer wires with the direction of flow. For example, when employing a 20 x 350 type screen, the screen should be aligned prior to rolling so that the 350 wires per inch are longitudinal and coaxial with the direction of flow of crystals. Alignment of the fine wires transverse to the direction of flow does not provide the necessary mechanical strength to resist the tremendous pressures developed by the moving mass of crystals and the increased resistance results in rapid deterioration of the screen.

The invention is broadly applicable to the resolution of a mixture of crystals from a mother liquor. In order to illustrate some of the systems to which the invention is applicable, the following compounds are grouped with respect to their boiling points and freezing points.

|  | B. P., °C. | F. P., °C. |
| --- | --- | --- |
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cyclohexadiene | 80.5 | −98 |
| 2,4-dimethylpentane | 80.8 | −123.4 |
| 2,2,3-trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |
| Group B: | | |
| Methylcyclohexane | 100.3 | −126.3 |
| Cyclohexane | 81.4 | 6.5 |
| n-Heptane | 98.52 | −90.5 |
| 2,2,4-trimethylpentane (isooctane) | 99.3 | −107.4 |
| Nitromethane | 101 | −29 |
| p-Dioxane | 101.5 | 11.7 |
| 2-peptanone | 101.7 | −77.8 |
| 2-methyl-2-butanol | 101.8 | −11.9 |
| 2,3-dimethylpentane | 89.4 | |
| 3-ethylpentane | 93.3 | −94.5 |
| Group C: | | |
| Toluene | 110.8 | −95 |
| Methylcyclohexane | 100.3 | −126.3 |
| 2,2,3-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-3-methylpentane | 119 | |

|  | B. P., °C. | F. P., °C. |
| --- | --- | --- |
| Group D: | | |
| Aniline | 184.4 | −6.2 |
| Toluene | 110.8 | −95 |
| Benzene | 80.0 | 5.5 |
| Group E: | | |
| Carbon tetrachloride | 77 | −22.8 |
| Chloroform | 61 | −63.5 |
| CS₂ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | −25 |
| Para-cymene | 176.0 | −73.5 |
| Group H: | | |
| Dimethyl phthalate | 282 | 5.5 |
| Dimethyl isophthalate | 124 (12 mm.) | 67 |
| Dimethyl terephthalate | 288 | 140.6 |
| Group I: | | |
| Ortho-nitrotoluene | 222.3 | −10.6, 4.1 |
| Metha-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups; for example, benzene can be separated from a benzene-n-hexane or a benzene-n-heptane mixture in which the benzene is present in an amount greater than the eutectic concentration. In the same manner, para-xylene can be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, 2,2,3-trimethylbutane, methyl cyclohexane, and 2,2,4-trimethylpentane, and mixtures of at least two of carbon tetrachloride, chloroform and acetone. The invention is also applicable to the separation of individual components from a mixture of cymenes.

This invention can also be utilized to purify crude naphthalene, hydroquinone (1,4-benzenediol), paracresol, para-dichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from other $C_{10}$ aromatics. In cases where the material to be purified has a relatively high crystallization point, the impure material is raised to a temperature at which only a portion of the mixture is in a crystalline state, and the resulting slurry is handled at such a temperature that operation is as described in connection with materials which crystallize at lower temperatures.

The invention is also applicable to the concentration of food products. In the preparation of such concentrated foods, the process consists generally of the removal of water, in the form of ice crystals, from such products. One special class of foods which can be concentrated in this manner is that of fruit juies, such as grape, pineapple, watermelon, apple, orange, lemon, lime, tangerine, grapefruit and the like. Beverages such as milk, wine, beer, coffee, tea and various liquors can also be concentrated in such a process. The process is also applicable to the concentration of vegetable juices.

The following specific example illustrates the advantages of the filter of this invention.

EXAMPLE

To simulate the concentration of beer, a mixture of methanol-water was fed to a crystallizer and then into a 6 inch diameter vertical crystal purification column of the pulse type described in U.S. 2,854,494. The feed contained from 12-19 weight percent methanol and the pulse displacement was 4 cubic inches at about 150 strokes per minute. The control runs 1-3 employed a filter section, comprised of a ⅛ inch perforated backup screen, a 10 x 10 backup coarse screen, a 20 x 350 stainless steel Dutch twill filter screen and a ⅛ inch perforated inner liner. In the apparatus of the invention employed in Runs 4-6, a new assembly was prepared which not only did not contain the inner liner but also the surfaces exposed to the ice were ground smooth. In addition, the filter screen contacting the ice was positioned so that the 350 wires/inch direction offered the least resistance to the flow of ice, i.e., longitudinally in the filter assembly.

| Run No. | Water Product Temperature, °F. | Wt. Percent Ice in Feed | Flow Rates, g.p.h. | | | Methanol Concentration in Water Product, Wt. Percent |
|---|---|---|---|---|---|---|
| | | | Water Product | Mother Liquor | Total | |
| 1 (Control) | 57 | 17.5 | 2.0 | 14.3 | 16.3 | 0.2 |
| 2 (Control) | 72 | 28 | 2.0 | 6.6 | 8.6 | 0.15 |
| 3 (Control) | 71 | 29 | 3.0 | 8.7 | 11.7 | 0.77 |
| 4 | 71 | 20 | 6.2 | 21 | 27.2 | 0.08 |
| 5 | 73 | 21 | 7.0 | 21 | 28.0 | 0.22 |
| 6 | 75 | 20 | 6.9 | 18.6 | 25.5 | 0.13 |

From the above data, it is obvious that the filter of this invention not only greatly improves throughput but also significantly reduces the waste of product loss with the water.

We claim:

An apparatus for the separation of mother liquor from a slurry, composed of mother liquor and crystals whereby an improvement in the rate of flow of slurry through the apparatus and a reduction in the loss of crystals to the mother liquor being separated therefrom is achieved, in combination:

(a) a purification chamber;
(b) melt means positioned in one end of said chamber;
(c) an open ended cylindrical filter housing, positioned in said chamber upstream from said melt means;
(d) an open ended cylindrical perforated member positioned in said housing and forming an annular space therewith;
(e) cover means for enclosing said annular space;
(f) an open ended cylindrical coarse screen member positioned inside of said perforated member and being in contact therewith, said coarse screen being composed of parallel wire members supported by intermeshing parallel wire members forming openings therebetween having a surface area intermediate the surface area of the perforations in said perforated member and the openings in a fine screen hereinafter described;
(g) an open ended cylindrical fine screen member, comprising a first and second series of wire members, positioned inside of said coarse screen member and in contact therewith, said first series of wire members being positioned axially parallel with the cylindrical filter housing and spaced to provide the desired openings for passage of mother liquor from the interior of said cylindrical filter housing into the annular space formed in said cylindrical filter housing, said first series of wire members being supported transversely by said second series of wire members which are parallel to each other and in alignment with the sides of said filter housing and having a spacing substantially greater than said first series of wire members;
(h) means for passing a slurry, composed of mother liquor and crystals, axially across said fine screen and thence toward the melt means, so that the crystals are in contact with the fine screen;
(i) means for applying a series of pressure pulsations to the slurry contents in said chamber;
(j) means for removing mother liquor from said annular space in the cylindrical filter housing;
(k) means for removing melt from said one end of said purification chamber.

References Cited by the Examiner

UNITED STATES PATENTS

| | | | |
|---|---|---|---|
| 1,843,242 | 2/32 | Rafton | 210—433 X |
| 2,148,826 | 2/39 | Mallard | 210—489 X |
| 2,757,800 | 8/56 | Kocera | 210—433 X |
| 2,765,921 | 10/56 | Green | 210—434 X |
| 2,775,550 | 12/56 | Harlow | 210—433 X |
| 2,854,494 | 9/58 | Thomas | 210—179 X |

REUBEN FRIEDMAN, *Primary Examiner.*

HERBERT L. MARTIN, *Examiner.*